(12) United States Patent
Pahwa et al.

(10) Patent No.: US 10,887,380 B2
(45) Date of Patent: Jan. 5, 2021

(54) MULTI-CLUSTER INGRESS

(71) Applicant: Google LLC, Mountain View, CA (US)

(72) Inventors: Manjot Pahwa, Mountain View, CA (US); Matthew Delio, Mountain View, CA (US); Bowei Du, Mountain View, CA (US); Rohit Ramkumar, Mountain View, CA (US); Nikhil Jindal, Mountain View, CA (US); Christian Bell, Mountain View, CA (US)

(73) Assignee: Google LLC, Mountain View, CA (US)

( * ) Notice: Subject to any disclaimer, the term of this patent is extended or adjusted under 35 U.S.C. 154(b) by 24 days.

(21) Appl. No.: 16/372,220

(22) Filed: Apr. 1, 2019

(65) Prior Publication Data

US 2020/0314173 A1   Oct. 1, 2020

(51) Int. Cl.
*G06F 9/50* (2006.01)
*H04L 29/08* (2006.01)
*H04L 29/06* (2006.01)

(52) U.S. Cl.
CPC ........ *H04L 67/1021* (2013.01); *G06F 9/5083* (2013.01); *H04L 67/02* (2013.01);
(Continued)

(58) Field of Classification Search
CPC ..... G06F 9/00; G06F 9/06; G06F 9/46; G06F 9/50; G06F 9/5083; H04L 41/00; H04L 41/04; H04L 41/042; H04L 41/50; H04L 47/00; H04L 47/70; H04L 47/78; H04L 47/783; H04L 67/00; H04L 67/02;
(Continued)

(56) References Cited

U.S. PATENT DOCUMENTS

| 5,774,660 A | * | 6/1998 | Brendel | H04L 29/06 709/201 |
| 6,006,264 A | * | 12/1999 | Colby | H04L 29/06 709/220 |

(Continued)

OTHER PUBLICATIONS

"HTTPS", Wikipedia (Year: 2018).*
Nisenson, "Anatomy of an HTTP Request", Jouney Into Coding (Year: 2015).*

*Primary Examiner* — Boris D Grijalva Lobos
(74) *Attorney, Agent, or Firm* — Honigman LLP; Brett A. Krueger

(57) ABSTRACT

A method for load balancing application requests across a multi-cluster container orchestration system includes receiving a load-balancing configuration for a multi-cluster service managing access to a set of destination clusters hosting a software application deployed by a user. The multi-cluster service uses the load-balancing configuration to load balance application level traffic across the set of destination clusters. Each destination cluster includes at least one container executing the software application and a respective geographical region. The method also includes receiving an application level request directed toward the software application hosted across the destination clusters. The application level request is received from a client and includes a host name and a geographical location associated with the client. The method also includes routing the request to one of the clusters based on the geographical location of the request and the respective geographical locations of the clusters.

24 Claims, 7 Drawing Sheets

(52) U.S. Cl.
CPC .......... *H04L 67/10* (2013.01); *H04L 67/1023* (2013.01); *H04L 67/34* (2013.01); *H04L 67/42* (2013.01)

(58) Field of Classification Search
CPC . H04L 67/10; H04L 67/1002; H04L 67/1004; H04L 67/1021; H04L 67/1023; H04L 67/34; H04L 67/42
See application file for complete search history.

(56) References Cited

U.S. PATENT DOCUMENTS

| | | | | |
|---|---|---|---|---|
| 6,134,588 A * | 10/2000 | Guenthner | .......... | H04L 61/1511 709/226 |
| 6,223,209 B1 * | 4/2001 | Watson | .......... | H04L 29/06 709/201 |
| 6,578,066 B1 * | 6/2003 | Logan | .......... | H04L 29/12009 370/312 |
| 6,856,991 B1 * | 2/2005 | Srivastava | .......... | H04L 29/12066 |
| 7,512,702 B1 * | 3/2009 | Srivastava | .......... | H04L 45/00 370/236 |
| 7,650,427 B1 * | 1/2010 | Liu | .......... | G06Q 20/401 370/237 |
| 9,064,124 B1 * | 6/2015 | Davis | .......... | G06F 21/606 |
| 9,384,227 B1 * | 7/2016 | Xiao | .......... | G06F 16/278 |
| 10,097,503 B2 * | 10/2018 | Bergman | .......... | H04L 67/2842 |
| 10,104,185 B1 * | 10/2018 | Sharifi Mehr | .......... | H04L 67/16 |
| 10,257,179 B1 * | 4/2019 | Saylor | .......... | H04W 12/06 |
| 10,326,744 B1 * | 6/2019 | Nossik | .......... | H04L 9/0822 |
| 10,331,380 B1 * | 6/2019 | Florissi | .......... | G06F 3/0604 |
| 10,372,499 B1 * | 8/2019 | Radhakrishnan | .......... | G06F 9/5044 |
| 10,404,613 B1 * | 9/2019 | Brooker | .......... | H04L 47/70 |
| 10,616,707 B2 * | 4/2020 | McLarty | .......... | H04L 67/1097 |
| 10,686,874 B2 * | 6/2020 | Yin | .......... | H04L 67/1029 |
| 2002/0052942 A1 * | 5/2002 | Swildens | .......... | H04L 67/06 709/223 |
| 2004/0117794 A1 * | 6/2004 | Kundu | .......... | G06F 9/505 718/102 |
| 2004/0205693 A1 * | 10/2004 | Alexander | .......... | H04L 47/20 717/100 |
| 2008/0086523 A1 * | 4/2008 | Afergan | .......... | G06F 16/958 709/202 |
| 2008/0247395 A1 * | 10/2008 | Hazard | .......... | H04L 45/00 370/392 |
| 2011/0035497 A1 * | 2/2011 | Daly | .......... | G06F 9/5027 709/226 |
| 2011/0055863 A1 * | 3/2011 | Faimatea | .......... | H04N 21/25875 725/25 |
| 2011/0276679 A1 * | 11/2011 | Newton | .......... | H04L 67/1034 709/224 |
| 2012/0198043 A1 * | 8/2012 | Hesketh | .......... | H04L 67/2842 709/223 |
| 2012/0226721 A1 * | 9/2012 | Raju | .......... | G06F 16/29 707/812 |
| 2012/0239722 A1 * | 9/2012 | Bolosky | .......... | G06F 16/275 709/201 |
| 2013/0031060 A1 * | 1/2013 | Lowery | .......... | G06F 16/9574 707/689 |
| 2013/0297596 A1 * | 11/2013 | Mouline | .......... | H04L 61/1511 707/724 |
| 2014/0108656 A1 * | 4/2014 | Salinca | .......... | G06F 9/505 709/226 |
| 2014/0229606 A1 * | 8/2014 | Griswold | .......... | H04L 41/0663 709/224 |
| 2014/0280707 A1 * | 9/2014 | Shukla | .......... | H04L 67/1006 709/217 |
| 2014/0344331 A1 * | 11/2014 | Johns | .......... | H04L 45/64 709/203 |
| 2015/0120931 A1 * | 4/2015 | Padala | .......... | G06F 9/5077 709/226 |
| 2015/0207889 A1 * | 7/2015 | Singhal | .......... | H04W 4/029 709/217 |
| 2015/0256481 A1 * | 9/2015 | Turovsky | .......... | H04L 67/10 709/226 |
| 2015/0304433 A1 * | 10/2015 | Xiao | .......... | H04L 67/148 709/203 |
| 2015/0358171 A1 * | 12/2015 | Rosenberg | .......... | H04L 47/70 709/204 |
| 2016/0092208 A1 * | 3/2016 | Nicol | .......... | G06F 9/5055 717/121 |
| 2016/0112403 A1 * | 4/2016 | Shi | .......... | H04L 9/302 726/7 |
| 2016/0285992 A1 * | 9/2016 | Katsev | .......... | H04L 67/22 |
| 2016/0366038 A1 * | 12/2016 | Fedorov | .......... | H04L 67/101 |
| 2017/0249141 A1 * | 8/2017 | Parees | .......... | G06F 11/3668 |
| 2018/0088993 A1 * | 3/2018 | Gerdesmeier | .......... | G06F 9/5005 |
| 2019/0065323 A1 * | 2/2019 | Dhamdhere | .......... | G06F 11/1451 |
| 2019/0173796 A1 * | 6/2019 | Li | .......... | H04L 61/25 |
| 2019/0306228 A1 * | 10/2019 | Lau | .......... | H04L 67/101 |

* cited by examiner

MULTI-CLUSTER INGRESS

TECHNICAL FIELD

This disclosure relates to a multi-cluster ingress for a containerized orchestration system.

BACKGROUND

Some cloud-based services (via distributed systems) offer containerized orchestration systems. These systems have reshaped the way software is developed, deployed, and maintained by providing virtual machine-like isolation capabilities with low overhead and high scalability. Software applications execute in secure execution environments (e.g., containers or pods) and co-located pods may be grouped into clusters, each cluster isolated from other clusters. Load Balancers are commonly used to improve the distribution of traffic and workloads across pods within a cluster. Layer 7 (L7) load balancing, (i.e., application layer) load balances the actual content of messages. For example, an L7 load balancer might operate on HyperText Transfer Protocol (HTTP) or HyperText Transfer Protocol Secure (HTTPS), and make routing decisions on the content of the message. Load balancers for containerized orchestration systems are typically L7 load balancers that operate on a single cluster.

SUMMARY

One aspect of the disclosure provides a method for load balancing application requests across a multi-cluster containerized orchestration system. The method includes receiving, at data processing hardware, a load-balancing configuration for a multi-cluster service managing access to a set of destination clusters hosting a software application deployed by a user. The multi-cluster service is configured to use the load-balancing configuration to load balance application level traffic associated with the software application across the set of destination clusters. Each destination cluster includes at least one container executing the software application and a respective geographical region that is the same or different than at least one other geographical region associated with another one of the destination clusters in the set of destination clusters. The method also includes receiving, at the data processing hardware, an application level request directed toward the software application hosted across the set of destination clusters. The application level request is received from a client and includes a host name and a geographical location associated with the client. The method also includes routing, by the data processing hardware, the application level request to one of the destination clusters in the set of destination clusters based on the geographical location of the application level request and the respective geographical regions of the set of destination clusters.

Implementations of the disclosure may include one or more of the following optional features. In some implementations, routing the application level request includes determining which destination cluster in the set of destination clusters is closest to the geographical location associated with the client of the application level request based on the respective geographical regions of the set of destination clusters and routing the application level request to the destination cluster in the set of destination clusters having the respective geographical region that is closest to the geographical location associated with the client of the application level request. In some examples, routing the application level request is further based on respective load balancing attributes specified by the multi-cluster service for each destination cluster in the set of destination clusters. The received load-balancing configuration may include a user-derived service name that uniquely identifies the multi-cluster service.

In some implementations, the method includes identifying, by the data processing hardware, cluster selection criteria specified by the multi-cluster service for choosing clusters from a cluster registry that will serve application level traffic for the multi-cluster service and selecting, by the data processing hardware, the set of destination clusters from the cluster registry based on each destination cluster in the set of destination clusters having a respective set of one or more labels that satisfy the cluster selection criteria specified by the multi-cluster service. The cluster selection criteria specified by the multi-cluster service may include at least one of one or more equality-based matching requirements or one or more set-based matching requirements. Optionally, the method further includes, for each destination cluster in the set of destination clusters, instantiating, by the data processing hardware, a corresponding derived service within the destination cluster. The derived service is configured to create a corresponding network endpoint group (NEG) that includes a group of endpoints. Each endpoint in the group of endpoints is associated with a respective container of the destination cluster and includes a respective internet protocol (IP) address and a respective port for distributing application level traffic directly to the respective container.

Each corresponding derived service includes, in some implementations, a unique derived service name that is different than the derived service names of the other derived services. The derived service name has a trimmed service name portion and a unique hash portion. The trimmed service name portion includes a user-derived service name of the multi-cluster service and the unique hash portion includes a unique hash of the user-derived service name of the multi-cluster service. The method, in some examples, further includes, in response to receiving the application level request, accessing, by the data processing hardware, a uniform resource locator (URL) mapping. The URL mapping specifies a list of one or more host names that map to a service of the one or more destination clusters. The method also includes determining, by the data processing hardware, whether the host name of the received application level request includes one of the host names in the list of one or more host names specified by the URL mapping, and when the host name of the received application level request includes one of the host names in the list, forwarding, by the data processing hardware, the received application level request to the service.

The application level traffic may include HyperText Transfer Protocol (HTTP). The application level traffic may also include HyperText Transfer Protocol Secure (HTTPS) protocol. At least a portion of the application level request optionally includes a transport layer security (TLS) protocol. The method, in some implementations, further includes, prior to routing the application level request and for each destination cluster in the set of destination clusters, determining, by the data processing hardware, whether a number of application level requests currently routed to the destination cluster satisfies a maximum request rate, and when the number of application level requests satisfies the maximum request rate, preventing routing of the application level request to the destination cluster.

Another aspect of the disclosure provides a system for load balancing application requests across a multi-cluster containerized orchestration system. The system includes data processing hardware and memory hardware in communication with the data processing hardware. The memory hardware stores instructions that when executed on the data processing hardware cause the data processing hardware to perform operations. The operations include receiving a load-balancing configuration for a multi-cluster service managing access to a set of destination clusters hosting a software application deployed by a user. The multi-cluster service is configured to use the load-balancing configuration to load balance application level traffic associated with the software application across the set of destination clusters. Each destination cluster includes at least one container executing the software application and a respective geographical region that is the same or different than at least one other geographical region associated with another one of the destination clusters in the set of destination clusters. The operations also include receiving an application level request directed toward the software application hosted across the set of destination clusters. The application level request is received from a client and includes a host name and a geographical location associated with the client. The operations also include routing the application level request to one of the destination clusters in the set of destination clusters based on the geographical location of the application level request and the respective geographical regions of the set of destination clusters.

This aspect may include one or more of the following optional features. In some implementations, routing the application level request includes determining which destination cluster in the set of destination clusters is closest to the geographical location associated with the client of the application level request based on the respective geographical regions of the set of destination clusters and routing the application level request to the destination cluster in the set of destination clusters having the respective geographical region that is closest to the geographical location associated with the client of the application level request. In some examples, routing the application level request is further based on respective load balancing attributes specified by the multi-cluster service for each destination cluster in the set of destination clusters. The received load-balancing configuration may include a user-derived service name that uniquely identifies the multi-cluster service.

In some implementations, the operations include identifying cluster selection criteria specified by the multi-cluster service for choosing clusters from a cluster registry that will serve application level traffic for the multi-cluster service and selecting the set of destination clusters from the cluster registry based on each destination cluster in the set of destination clusters having a respective set of one or more labels that satisfy the cluster selection criteria specified by the multi-cluster service. The cluster selection criteria specified by the multi-cluster service may include at least one of one or more equality-based matching requirements or one or more set-based matching requirements.

Optionally, the operations further include, for each destination cluster in the set of destination clusters, instantiating a corresponding derived service within the destination cluster. The derived service is configured to create a corresponding network endpoint group (NEG) that includes a group of endpoints. Each endpoint in the group of endpoints is associated with a respective container of the destination cluster and includes a respective internet protocol (IP) address and a respective port for distributing application level traffic directly to the respective container.

Each corresponding derived service includes, in some implementations, a unique derived service name that is different than the derived service names of the other derived services. The derived service name has a trimmed service name portion and a unique hash portion. The trimmed service name portion includes a user-derived service name of the multi-cluster service and the unique hash portion includes a unique hash of the user-derived service name of the multi-cluster service. The operations, in some examples, further include, in response to receiving the application level request, accessing a uniform resource locator (URL) mapping. The URL mapping specifies a list of one or more host names that map to a service of the one or more destination clusters. The operations also include determining whether the host name of the received application level request includes one of the host names in the list of one or more host names specified by the URL mapping, and when the host name of the received application level request includes one of the host names in the list, forwarding the received application level request to the service.

The application level traffic may include HyperText Transfer Protocol (HTTP). The application level traffic may also include HyperText Transfer Protocol Secure (HTTPS) protocol. At least a portion of the application level request optionally includes a transport layer security (TLS) protocol. The operations, in some implementations, further include, prior to routing the application level request and for each destination cluster in the set of destination clusters, determining whether a number of application level requests currently routed to the destination cluster satisfies a maximum request rate, and when the number of application level requests satisfies the maximum request rate, preventing routing of the application level request to the destination cluster.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
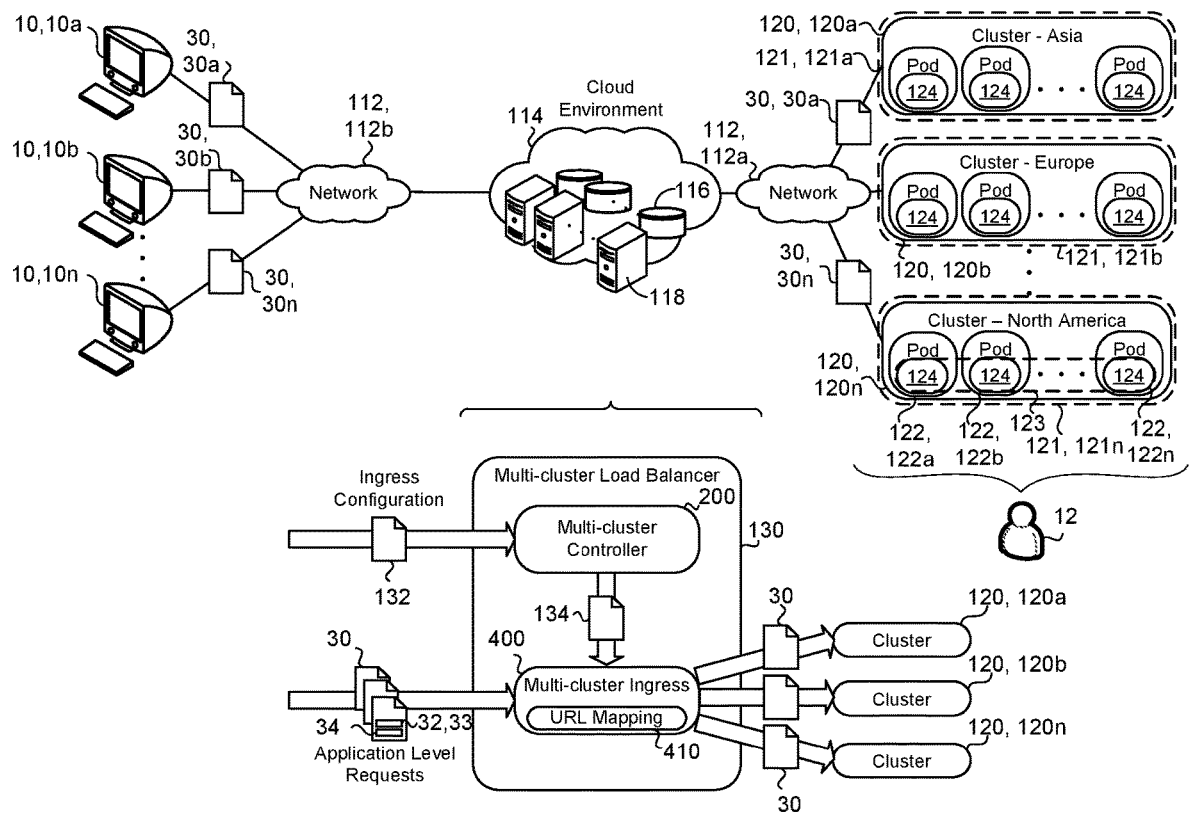
FIG. 1 is a schematic view of an example system for load balancing application level traffic across multiple clusters of a containerized orchestration system.

Containerized applications, and the systems that orchestrate containerized applications, are becoming increasingly popular due to, at least in part, advances in remote and distributed computing. Containerized applications (i.e., virtualization) allow for the existence of isolated user or application space instances. Each instance (i.e., container) may appear to the application as its own personal computer with access to all the resources necessary to execute (e.g., storage, network access, etc.). However, applications in containers will only be able to view and access resources assigned to its respective container. This facilitates security, mobility, scaling, and upgrading of applications in a distributed or cloud environment.

A container typically will be limited to a single application or process or service. Some container-orchestration systems deploy pods as the smallest available computing unit. A pod is a group of one or more containers, each container within the pod sharing isolation boundaries (e.g., IP address). Controllers control resources in pods. Controllers are responsible for monitoring the health of pods, containers, and resources (and recreating the pods/containers if necessary). Controllers are also responsible replicating and scaling pods, as well as monitoring for external (to the pod) events.

Because pods are typically temporary and fungible resources, they are frequently created and destroyed (i.e., scaled in or out). Because some pods (i.e., backends) provide functionality to other pods (i.e., frontends), services are created to allow frontends to track which backends provide the required functionality for the frontend. A service is an abstraction that defines a logical set of pods and a policy by which to access them. That is, one or more pods is targeted by a service that tie the backends to a corresponding frontend. The service may target pods that match a selection criteria. In some examples, the selection criteria includes label selection. That is, pods may include labels and the service may select the desired pods by equality-based or set-based label matching.

A single physical machine (i.e., computer or server) hosts one or more containers (e.g., pods). The container-orchestration system will often coordinate multiple containerized applications across a many pods using a cluster of physical machines. Typically, each machine in the cluster is co-located (i.e., the machines are geographically located near each other) with one or more machines functioning as a master server and the remaining machines functioning as nodes. The master server acts as the primary control plane and gateway for the cluster by, for example, exposing an Application Programming Interface (API) for clients, health checking the nodes, orchestrating communication, scheduling, etc. The nodes are responsible for accepting and executing workloads using local and external resources and each node creates and destroys containers as instructed by the master server. Clients interact with the cluster by communicating with the master server (e.g., directly or via libraries). The nodes within the cluster are generally isolated and segregated from contact outside of the cluster except as allowed by the master server.

Load balancing improves the distribution of workloads across multiple computing resources, and due to the distributed nature of container-orchestration systems, distributed systems frequently implement Layer 7 (L7) load balancing. Layer 7 load balancing operates at the high-level application layer (i.e., Layer 7), which involves the actual content of transmitted messages. HyperText Transfer Protocol (HTTP) and HyperText Transfer Protocol Secure (HTTPS) are the predominant L7 protocols for website traffic on the Internet. Because of the high level, L7 load balancers may route network traffic in a more sophisticated way than other layer load balancer (e.g., Layer 4 load balancers). Generally, a L7 load balancer terminates the network traffic and analyzes the message content within the traffic. The L7 load balancer may then route the traffic based on the content of the message (e.g., based on an HTTP cookie). The L7 balancer may then create a new connection to the proper destination node.

Current container-orchestration systems typically only offer L7 load balancing that target a single cluster. That is, each cluster requires a separate load balancer that requires individual configuration and traffic can only be balanced within the single cluster. To route traffic to an appropriate cluster (e.g., the cluster nearest geographically to the source client), separate domains may be needed. For example, asia.shopping.com may route to a cluster located in Asia while europe.shopping.com may route to a cluster in Europe. Thus, it would be advantageous for a load balancer that may serve highly-available, globally-distributed L7 services across multiple clusters in a container-orchestration system. Continuing with the example, the load balancer servicing multiple clusters could route a HTTP(S) request for shopping.com to either the cluster in Asia or the cluster in Europe based on a source of the HTTP(S) request and/or capacity at the clusters.

Implementations herein are directed toward a multi-cluster load balancer of a container-orchestration system to load balance application level traffic associated with a software application across a set of destination clusters. The multi-cluster load balancer receives a load-balancing configuration for a multi-cluster service that manages access to the set of destination clusters. As used herein, the load-balancing configuration may be referred to as an ingress configuration. Each destination cluster includes at least one pod executing the software application in a secure execution environment (i.e., at least partially isolated from other pods or clusters) and a respective geographical region. In some scenarios, the at least one pod/container executes the software application in a non-secure environment. Each cluster may have a different geographic region. The multi-cluster load balancer receives an application level request directed toward the software application hosted across the set of destination clusters and the load balancer routes the application level request to one of the destination clusters based on the geographical location of the application level request and the respective geographical regions of the set of destination clusters. Thus, the load balancer targets multiple clusters while providing a single point of management and configuration across all of the clusters. The load balancer may take advantage of container-native load balancing (i.e., distributing traffic directly to pods) and provides high availability for hosted services if a cluster goes offline.

Referring now to FIG. 1, in some implementations, an example system 100 includes a remote system 114. The remote system 114 may be a single computer, multiple computers, or a distributed system (e.g., a cloud environment) having scalable/elastic computing resources 118 (e.g., data processing hardware) and/or storage resources 116 (e.g., memory hardware). The remote system 114 communicates with, via network 112a, one or more clusters 120, 120a-n, and each cluster 120 includes one or more pods 122, 122a-n, each executing one or more applications 124. While the examples herein describe the clusters 120 including one or more pods 122, the clusters 120 may include any type of containers for executing the one or more software applications 124 without departing from the scope of the present disclosure. In some examples, part or all of one or more of the clusters 120 executes on the remote system 114. Some pods 122 may execute the same applications 124, while some pods 122, within the same cluster 120 or a different cluster 120, may execute different applications 124. For example, each cluster 120 may include pods 122 that execute a shopping application 124. A service 123 represents one or more applications 124 executing on multiple pods 122 within the same cluster 120. To continue the previous example, a shopping service 123 may use the shopping application 124 that is executing on multiple pods 122. For example, all pods 122 executing the shopping application 124 may be associated with the shopping service 123, and each respective pod 122 may be a fungible resource to fulfill a request 30 to use the shopping service 123.

Each cluster 120 is also associated with a respective geographical region 121, 121a-n. For example, the cluster 120a may be associated with the geographical region 121a of Asia, the cluster 120b may be associated with the geographical region 121b of Europe, and the cluster 120n may be associated with the geographical region 121n of North America. That is, each cluster 120 may be associated with the geographical region 121 of where the cluster 120 is physically located. Each cluster 120 may be located in a different geographical region 121, although in some examples, multiple clusters 120 share a same geographical region 121.

The remote system 114 is also in communication with one or more clients 10, 10a-n via a network 112b. The networks 112a, 112b may be the same network or different networks. Each client 10 may correspond to any suitable computing device, such as a desktop workstation, laptop workstation, mobile device (e.g., smart phone or tablet), wearable device, smart appliance, smart display, or smart speaker. The clients transmit application level requests 30, 30a-n to the remote system 114 via the network 112b. The application level requests 30 correspond to messages of an application protocol. For example, the application level requests 30 may include HTTP or HTTPS messages. That is, the application level requests 30 may correspond to HTTP(S) request messages from the clients 10. Optionally, the application level requests 30 may include the TLS protocol to provide additional communications security.

The remote system 114, in some examples, executes a multi-cluster load balancer 130 that receives the application level requests 30 and a load-balancing configuration (e.g., ingress configuration) 132 that configures the load balancer 130 to load balance the application level requests 30. Each application level request 30 includes a host name 32 and a geographical location 34 associated with the source client 10. The host name 32 corresponds to a selection criteria (e.g., a label) that identifies a destination network host (i.e., one or more computers under common authority). For example, http://my-shop.com is a Uniform Resource Locator (URL) that indicates the HTTP protocol and a host name of my-shop.com. The geographical location 34 corresponds to a physical location of the respective client 10 (e.g., an Internet Protocol (IP) address). Some application level requests 30 may additionally include a path name 33, e.g., the http:/my-shop.com/sports URL indicates the host name of my-shop.com and a path name of /sports.

The load balancer 130 manages access to the clusters 120 (also referred to as destination clusters 120) that host the software application 124 for a user 12. That is, using the configuration provided by the load-balancing configuration (e.g., ingress configuration) 132, the load balancer 130 receives application level requests 30 that are directed toward the software application 124 on the destination clusters 120 and routes each application level request 30 to one of the destination clusters 120 based on the geographical location 34 of the application level request 30 and the respective geographical regions 121 of the destination clusters 120. For example, when the geographical location 34 associated with a respective application level request 30 indicates that the application level request 30 originated from North America, the load balancer 130 may route the application level request 30 to the cluster 120n with a corresponding geographical region 121n (i.e., North America).

With continued reference to FIG. 1, in some implementations, a multi-cluster controller 200 receives the load-balancing configuration 132 and, using the load-balancing configuration 132, configures a multi-cluster ingress 400. The multi-cluster ingress 400 configured by the multi-cluster controller 200 includes a mapping of URL paths (i.e., URL mapping 410) to software applications 124 executing on clusters 120. That is, when the multi-cluster ingress 400 receives an application level request 30 directed toward a respective software application 124 executing within a respective pod 122 of a respective cluster 120, the multi-cluster ingress 400 routes the application level request 30, using the URL mapping 410, to the appropriate cluster 120 based on the geographical location 34 and the associated software application 124 of the application level request 30. The user 12 may correspond to a creator of the destination clusters 120 for hosting the applications 124 or services 123. As such, the user 12 may provide the load-balancing configuration 132 to the multi-cluster controller 200 of the multi-cluster load balancer 130.

Figure 2:
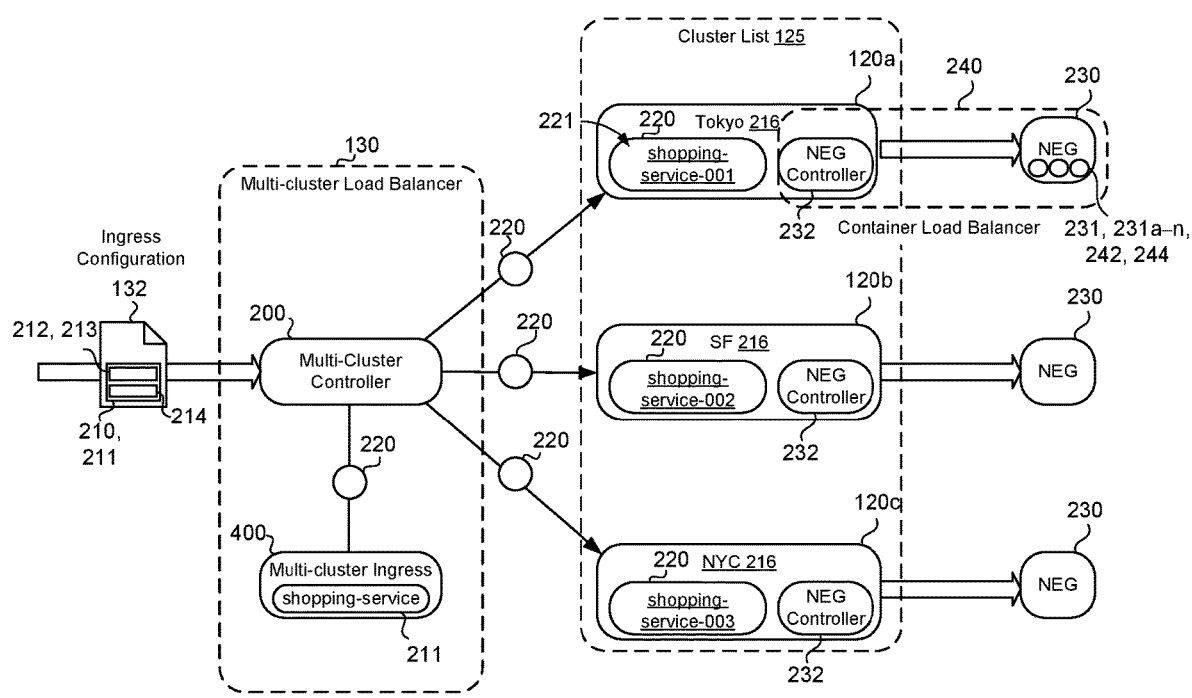
FIG. 2 is a schematic view of an example multi-cluster controller of the system of FIG. 1.

Referring now to FIG. 2, the multi-cluster controller 200, in some examples, is responsible for receiving a multi-cluster service 210 of the load-balancing configuration 132. For instance, the multi-cluster load balancer 130 may instantiate the multi-cluster service 210 based on the load-balancing configuration 132. The multi-cluster service 210 represents a resource that spans multiple clusters 120. In some examples, the load-balancing configuration 132 includes a user-derived service name 211 (i.e., a service name derived by the user 12) that uniquely identifies the multi-cluster service 210. The multi-cluster service 210, in some implementations, includes a cluster selection section 212 that defines which clusters 120 are destination clusters 120 and the load balancing properties of the destination clusters 120. That is, the cluster selection section 212 identifies cluster selection criteria 213 specified by the multi-cluster service 210 for choosing clusters 120 from a known cluster list 125 that will serve application level traffic (i.e., application level requests 30) for the multi-cluster service 210. The known cluster list 125 may include a registry of known clusters 120, or simply refer to a cluster registry that may be stored on the storage resources 116 of the remote system 114 and include a plurality of clusters that the user 12 owns/created or has access to. Using the cluster selection criteria 213, the multi-cluster controller 200 then selects the set of destination clusters 120 from the cluster registry 125 based on each destination cluster 120 having a respective set of one or more labels 216 that satisfy the cluster selection criteria 213 specified by the multi-cluster service 210. That is, the selected clusters 120 may share a common set of labels 216 to enable the clusters 120 to be selected as a unit across all of the clusters 120. Optionally, the cluster selection criteria 213 specified by the multi-cluster service 210 includes at least one of one or more equality-based matching requirements (e.g., environment=production) or one or more set-based matching requirements (e.g., environment in (production, qa)).

The multi-cluster service 210 may also include a service template 214 that defines a service 220 that the multi-cluster controller 200 instantiates/creates in each destination cluster 120 and the load balancer 130. In some examples, by defining the multi-cluster service 210, the multi-cluster controller 200 may instantiate the derived services 220 in the destination clusters 120 automatically. In the example shown, the multi-cluster controller 200 receives the multi-cluster service 210 (along with the cluster selection section 212 and the service template 214) and instantiates a corresponding derived resource (i.e., the shopping-service 220) in each destination cluster 120a, 120b, 120c. The multi-cluster controller 200 may automatically manage the entire lifecycle of the derived services 220 (e.g., creating, syncing, and deleting the services 220). The multi-cluster controller 200 may instantiate and manage the derived services 220 using create, read, update, and delete (CRUD) operations. Thus, application level requests 30 that correspond to the multi-cluster service 210 (e.g., shopping-service) may route via the multi-cluster ingress 400 to the derived service 220 of the appropriate destination cluster 120.

Each corresponding derived service 220 may include a unique derived service name 221 that is different than the derived service names 221 of the other derived services 220. For example, the derived service name 221 has a trimmed service name portion and a unique hash portion. The trimmed service name portion may include the user-derived service name 211 of the multi-cluster service 210 and the unique hash portion may include a unique hash of the user-derived service name of the multi-cluster service 210. The respective unique derived service name 221 for each derived service 220 may avoid conflicts with names of user-defined services 123.

In some examples, the derived services 220 create a corresponding network endpoint group (NEG) 230 that includes a group of endpoints 231, 231a-n. Each endpoint 231 in the group of endpoints 231 is associated with a respective pod 122 of the corresponding destination cluster 120. Each endpoint 231 includes a respective internet protocol (IP) address 242 and a respective port 244 for distributing application level traffic (i.e., requests 30) directly to the respective pod 122. That is, NEGs 230 are resources that represent collections of IP address 242 and port 244 combinations for cluster resources that operate as a backend for backend services and each IP address 242 and port 244 combination is referred to as a network endpoint 231. NEGs 230 may be used as backends in backend services such as HTTP(S), Transmission Control Proxy (TCP) proxy, and SSL proxy load balancers. NEG backends facilitate distributing traffic in a granular fashion among applications or containers running within pods 122 by specifying IP addresses 242 and ports 244. Endpoints 231 (e.g., pods 122) in the same cluster 120 may be assigned to the NEG 230. The NEG 230 may serve as a backend for backend services in a container load balancer 240 (i.e., a load balancer for balancing traffic among the machines or pods 122 in the cluster 120). Each destination cluster 120 may include a corresponding NEG controller 232 to program the respective NEG 230.

In other examples, the clusters 120 implement instance groups instead of NEGs 230. Instance groups, similar to NEGs 230, group a collection of endpoints (e.g., virtual machine instances) together as a single entity and routes requests 30 to the appropriate endpoint by using IP tables. An instance group may be a managed instance group with or without auto scaling or an unmanaged instance group.

When implementing NEGs 230 instead of instance groups, the multi-cluster controller 200 may store names (i.e., labels) of each NEG 230 for easy retrieval by other components of the system 100. Each NEG 230 may include a firewall that is managed by the NEG controller 232, allowing each NEG to open a unique set of ports 244. Alternatively or additionally, the multi-cluster controller 200 may instantiate a firewall controller that affects the port ranges of every destination cluster 120. The firewall controller, for example, could ensure the entire port range is open and then allow each individual NEG controller 232 to customize its respective port range.

Figure 3A:
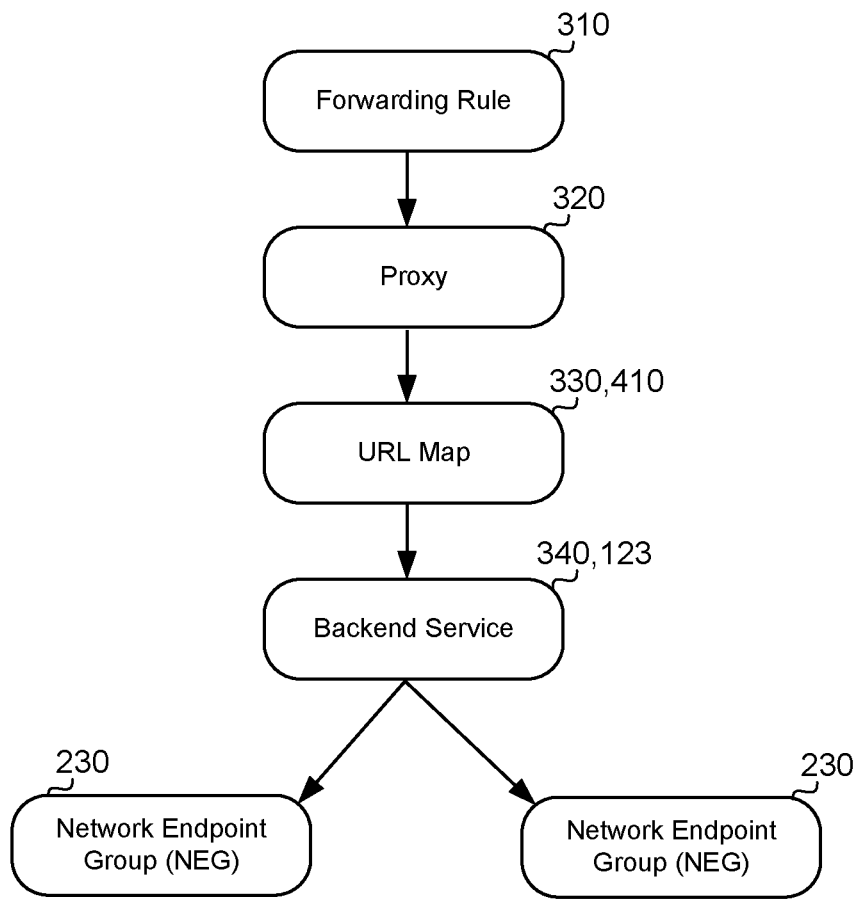
FIGS. 3A and 3B are schematic views of exemplary components of a container load balancer including network endpoint groups.
Figure 3B:
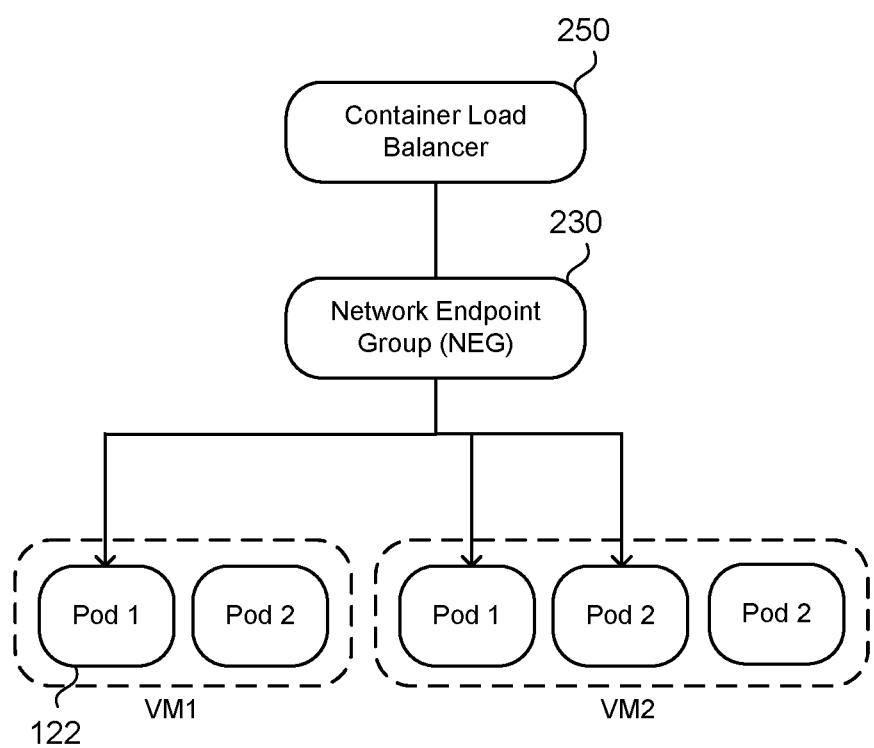

Referring now to FIGS. 3A and 3B, in some examples, the remote system 114 executes additional components to implement the container load balancer 240. For example, a forwarding rule 310 may direct application level requests 30 from the respective cluster's 120 global external IP address to an appropriate target proxy 320 (FIG. 3A). The forwarding rule 310 routes requests 30 by IP address, port, and protocol to a load balancing configuration consisting of the target proxy 320, a URL mapping 330 (e.g., URL mapping 410), and one or more backend services 340, i.e., service(s) 123 (FIG. 1). Each forwarding rule 310 may provide a single global IP address for the cluster 120. The target proxy 320 terminates connections (e.g., HTTP and HTTPS connections) from clients 10. The target proxy 320 checks each received request 30 against a URL mapping 330 to determine which backend service 340 is appropriate for the request 30. When routing HTTPS connections, the target proxy 320 may include one or more Secure Sockets Layer (SSL) certificate to authenticate communications between the load balancer 240 and the client 10.

As shown in FIG. 3B, unlike instance groups, which route traffic via IP table rules to containers (e.g., pods) 122 (which may or may not be in the same node/Virtual Machine), NEGs 230 allow for traffic to be routed directly to the containers (e.g., pods) 122 that should receive the traffic (i.e., requests 30), which eliminates an extra network hop. The reduced network hops improves both the latency and throughput of the network.

The URL mapping 330 defines matching patterns for URL-based routing of requests 30 to the appropriate backend services 340. In some examples, a default service 340 is defined to handle any requests 30 that do not match a specified host rule or path matching rule. Optionally, the multi-cluster controller 200 may create a derived default service in the destination clusters 120. For content-based routing of requests 30, the URL mapping 330 divides requests 30 by examining URL components to send requests 30 to different sets of backends 340. Multiple backend services 340 may be referenced from the URL mapping 330.

The backend services 340 direct incoming requests 30 to one or more endpoints of attached NEGs 230. The backend service 340 directs each request 30 to an appropriate endpoint of one of the connected NEGs 230 based on, for example, serving capacity, zone, and instance health of its attached backends. Endpoint serving capacity may be based on CPU or requests per second (RPS) (i.e., an amount of requests 30 the endpoint can process per second). Each backend service 340 may also specify which health checks to perform against the endpoints of the NEGs 230.

Figure 4:
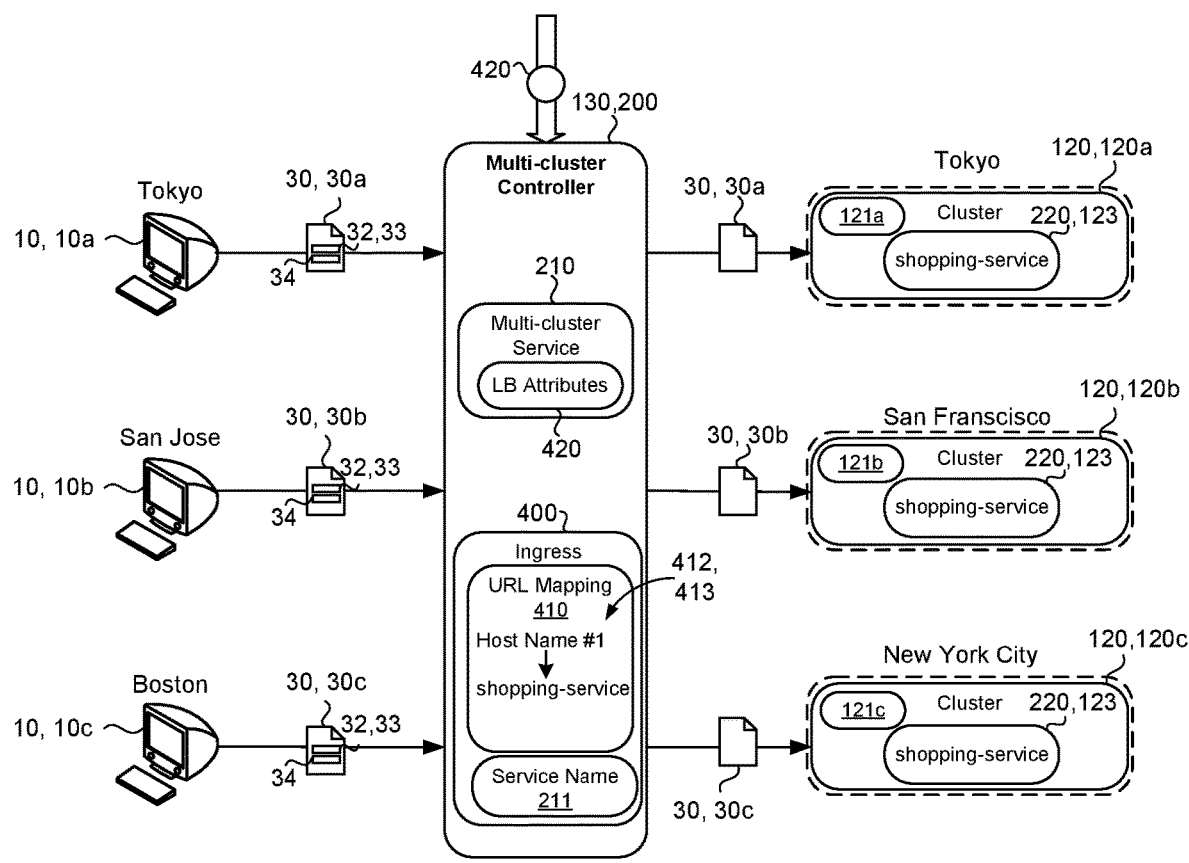
FIG. 4 is a schematic view of an example multi-cluster ingress of the system of FIG. 1.

Referring now to FIG. 4, the multi-cluster controller 200 manages the multi-cluster ingress 400 and the multi-cluster service 210 defined by the multi-cluster ingress 400 using the user-derived service name 211. The multi-cluster ingress 400 includes Layer 7 protocol and termination settings (e.g., Transport Layer Security (TLS) certificates) and the URL mapping 410 specifies a list of one or more host names 412 and/or URL paths that map to one or more services 123 executing on the destination clusters 120. Each destination cluster 120 includes a respective derived service 220 that communicates with the multi-cluster service 210. For each application level request 30 directed toward a software application 124 (or service 123) the multi-cluster controller 200 receives, the multi-cluster controller 200 determines whether the host name 32 of the received application level request 30 includes one of the host names 412 in the list of one or more host names 412 specified by the URL mapping 410. Instead of or in addition to, the controller 200 may determine whether the URL path 33 of the received application level request 30 includes one of the paths in the list of paths 413 specified by the URL mapping 410. When the host name 32 (and/or path 33) of the received application level request 30 includes one of the host names 412 (and/or paths 413) in the list, the multi-cluster controller 200 forwards the received application level request 30 to the multi-cluster service 210 associated with the application 124 or service 123 (e.g., shopping-service). Here, the multi-cluster service controller 200 is tasked with load-balancing the received application level request 30 to the respective destination service 220 of one of the destination clusters 120, 120a-c executing the deployed service 123. In some implementations, the multi-cluster service controller 200 determines which destination cluster 120 is closest to the geographical location 34 of the request 30 (e.g., the location 34 associated with the client 10 that transmitted the request 30) based on the respective geographical regions 121a-c of the destination clusters 120. The multi-cluster controller 200, via routing decisions defined by the multi-cluster service 210, may route the application level request 30 to the destination cluster 120 that has the respective geographical region 121 that is closest to the geographical location 34 associated with the client 10 of the application level request 30.

In the example shown, a client 10a is located in Tokyo, a client 10b is located in San Jose, and a client 10c is located in Boston. Further a set of destination clusters 120 executing a shopping-service 123, includes a first cluster 120a associated with a geographical region 121a of Tokyo, a second cluster 120b associated with a geographical region 121b of San Francisco, and a third cluster 120c associated with a geographical region 121a of New York City. Each client 10a, 10b, 10c transmits a respective application level request 30a, 30b, 30c received by the controller 200. The controller 200, based on the geographical location 34 associated with the requests 30 (i.e., Tokyo, San Jose, and Boston), routes the request 30a to the cluster 120a, the request 30b to the cluster 120b, and the request 30c to the cluster 120c. In some examples, the multi-cluster controller 200 routes each request 30 based on the cluster 120 associated with the lowest latency (i.e., an amount of time the request 30 takes to travel from the client 10 to the respective cluster 120). That is, each destination cluster 120 has a respective latency from the client 10, and the multi-cluster controller 200 may route the request 30 to the cluster 120 with the lowest latency of each destination cluster 120 at any given instance in time. In other examples, the multi-cluster controller 200 routes each request based on equality matching a region label that is associated with the geographical location 34 of the request and a region label that is associated with the geographical region 121 of the cluster 120. For example, the request 30 may include a region label that corresponds to "Asia" and the multi-cluster ingress 400 may route the request 30 to a cluster with a matching region label (i.e., "Asia").

In some examples, the controller 200 routes the requests 30 based on respective load balancing (LB) attributes 420 specified by the multi-cluster service 210. For example, application level requests 30 may always be routed to the closest (i.e., closest geographically) available cluster 120. In some implementations, the clusters 120 will scale automatically (e.g., increase or decrease the number of containers (e.g., pods) 122 within each cluster 120) to accommodate client demand. In this example, each cluster has, in practice, limitless resources and thus, clients 10 will always be routed to the nearest cluster 120. By automatically scaling the number of resources on a per-cluster basis based on client demand, an amount of utilization (i.e., the percentage of resources in use versus the total available resources) per cluster 120 remains high. In the example of FIG. 4, when the clusters 120 have unlimited capacity to accommodate client demand, the clusters 120 may dynamically scale to meet end user demand such that when the load balancer 130 is receiving a greater number of application level requests 30 (i.e., requests per second) from Tokyo than from San Jose and Boston, the first cluster 120a within the geographical region 121a of Tokyo may scale up the number of resources/containers 122 (e.g., pods) to meet the increase in end user demand. At least one of the second and third clusters 120b, 120c within the other geographical regions 121b, 121a may also scale-down based on end user demand at the corresponding geographical locations 34. In these auto-scaling scenarios where the load balancer 130 routes requests 30 to the nearest geographical region 121, the clusters 120 may be required to synchronize state amongst one another in order to provide stateful services 123. The load balancer 130 may continuously update based on the dynamic capacity at each of the clusters 120.

In other implementations, the clusters 120 have a fixed resource capacity (i.e., the clusters 120 do not scale). In this situation, prior to routing the application level request 30, the multi-cluster controller 200, for each destination cluster 120, determines whether a number of application level requests 30 (e.g., requests per second) currently routed to the destination cluster 120 satisfies a maximum request rate. When the number of application level requests 30 satisfies the maximum request rate, the multi-cluster controller 200 prevents routing of the application level request 30 to the destination cluster 120. That is, the load balancing attributes 420 may include maximum request rates (i.e., maximum RPS) and in this situation, if the closest cluster based on the geographical region 121, as discussed above, has satisfied or exceeded its threshold RPS, the multi-cluster ingress 400 may route the request 30 to the next closest cluster 120 (e.g., based on the latency or the region labels). If the second closest cluster 120 also has exceeded its maximum RPS, the multi-cluster ingress 40 may move to the third closest cluster 120, and so on. Moreover, the fixed resource capacity associated with at least one of the destination clusters 120 may be different than the fixed resource capacities associated with the other destination clusters 120.

The load balancing attributes 420 may additionally or alternatively include multi-cloud and/or hybrid load balancing attributes that cause application level requests 30 to route to the nearest geographic cluster 120 with capacity to accommodate the request 30. The cluster 120 may be in another cloud computing network or even at the same geographical location 34 (e.g., on-premises) that the application level request 30 originated. This enables highly available services that are resilient to multiple regional outages in a single cloud computing network and eases the launch of a new cloud computing network.

Each cluster 120 may receive individualized load balancing attributes 420 or the same attributes 420 may be applied to all destination clusters 120. When the user 12 provides no load balancing attributes 420, the multi-cluster ingress 400 may route based on default behavior (e.g., the cluster 120 with the lowest latency).

In some implementations, the load balancing attributes 420 include data-locality routing attributes. That is, the load balancing attributes may route application level requests 30 to a cluster 120 based on HTTP(S) header information (e.g., HTTP cookies). This allows clients 10 to have their application level requests 30 routed to geographical locations/regions 121 of clusters 120 already hosting their data and help meet any data residency requirements or laws. As such, only a single IP address needs to be published for the underlying service 123 executing across the set of destination clusters 120. Data residency is generally defined as requirements that client data must be processed and/or stored within a specific country's borders. Optionally, the clusters 120 synchronize data between each other in order to serve multiple sets of clients 10 simultaneously. Here, the resources/containers/pods 122 may scale up or down within the respective clusters based on end user demand. The synchronized data also allows for application level requests 30 to be rerouted to alternate clusters 120 in the case a cluster 120 fails or is otherwise unhealthy. The load balancing attributes 420 include client-based routing where application level requests 30 are routed to services within a single cluster based on the HTTP(S) header information, such as HTTP cookies or geo-headers. This allows the load balancer 130 to easily group and route clients 10 to different services.

The load balancing attributes 420 may also include attributes for traffic splitting. Traffic splitting attributes enable the load balancer 130 to route application level requests 30 to the clusters 120 based on a percentage (%) split or RPS ratio among the clusters 120 defined by the user 12. That is, each cluster may be assigned (e.g., by the user 12) a percentage of total traffic (i.e., application level requests 30), and the controller 200 may randomly rout application level requests 30 to the cluster 120 based on the assigned percentages. Such traffic splitting eases the migration of workloads to a cluster 120 in a new geographical region 121 as the cluster 120 in the new geographical region 121 may be brought up slowly (i.e., start with a small percentage that increases over time, sometimes referred to as a canary deployment). Load balancing attributes 420 that specify attributes for traffic splitting may enable multi-region splitting or intra-region splitting. In multi-region splitting, traffic may be split across geographical regions 121. As such, multiple application level requests 30 from a same client 10 in a given geographical region 34 may be routed to clusters 120 in more than one geographical region 121. For instance, the client 10c in Boston could issue multiple application level requests 30, whereby the load balancer 130 routes a portion of these requests 30 to the third destination cluster 120c in the geographical region 121a associated with New York City and routes a remaining portion of these requests 30 to the first destination cluster 120a in the geographical region 121a associated with Tokyo. In intra-region splitting, traffic may only be split within the same geographical region 121. That is, application level requests 30, with intra-region splitting, may only be split within the same geographical region 121, while cross-region traffic is unaffected. For instance, clients 10 in Tokyo may be split among two separate clusters 120 located in a geographical region 121 associated with Asia, but not be routed to a cluster with a geographical region 121 associated with Europe. The load balancing attributes 420 may also enable intra-cluster traffic splitting. With intra-cluster traffic splitting, application level requests 30 may be randomly routed to services within a single cluster 120 based on assigned percentages (i.e., assigned by the load balancing attributes 420). This enables the testing of, for example, new versions of services. That is, a new version of a service may be routed a small percentage of traffic for testing while the majority of traffic is routed to the original version of the service.

Figure 5:
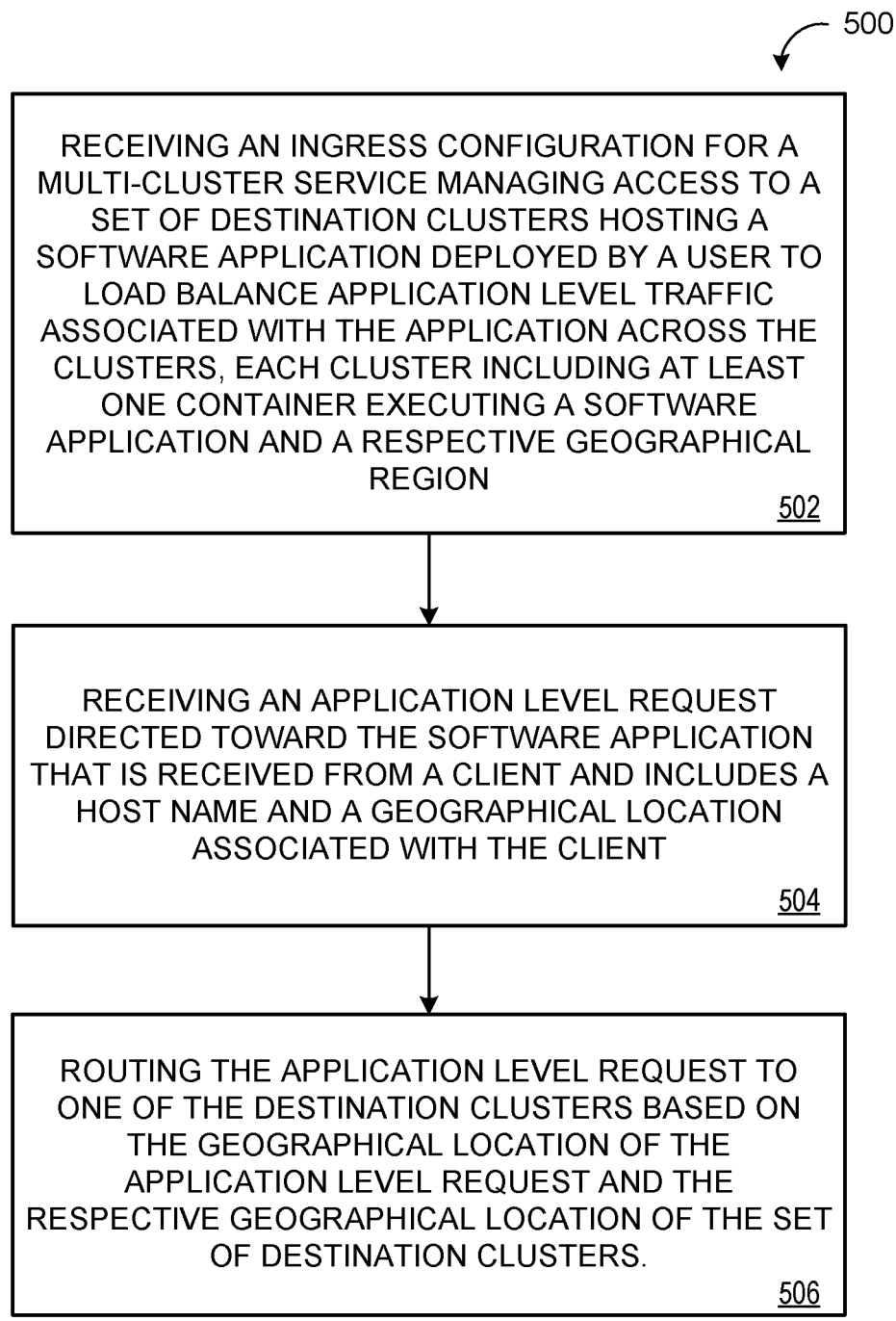
FIG. 5 is a flowchart of an example method for conserving resources in containerized systems.

FIG. 5 is a flowchart of an example method 500 for load balancing application level requests 30 across a multi-cluster containerized orchestration system 100. The method 500 may be described with reference to FIGS. 1-4. The method 500 starts at operation 502 with receiving, at data processing hardware 118, a load-balancing configuration 132 for a multi-cluster load balancer 130 managing access to a set of destination clusters 120 hosting a software application 124 deployed by a user 12. The multi-cluster load balancer 130 is configured to use the load-balancing configuration 132 to load balance application level traffic 30 associated with the software application 124 across the set of destination clusters 120. Each destination cluster 120 includes at least one container 122 executing the software application 124 and a respective geographical region 121 that is the same or different than at least one other geographical region 121 associated with another one of the destination clusters 120 in the set of destination clusters.

At operation 504, the method 500 includes receiving, at the data processing hardware 118, an application level request 30 directed toward the software application 124 hosted across the set of destination clusters 120. The application level request 30 is received from a client 10 and includes a host name 32 and a geographical location 34 associated with the client 10. The application level request 30 can also include a path name 33. At operation 506, the method 500 includes routing, by the data processing hardware 118, the application level request 30 to one of the destination clusters 120 in the set of destination clusters based on the geographical location 34 of the application level request 30 and the respective geographical regions 121 of the set of destination clusters 120.

Figure 6:
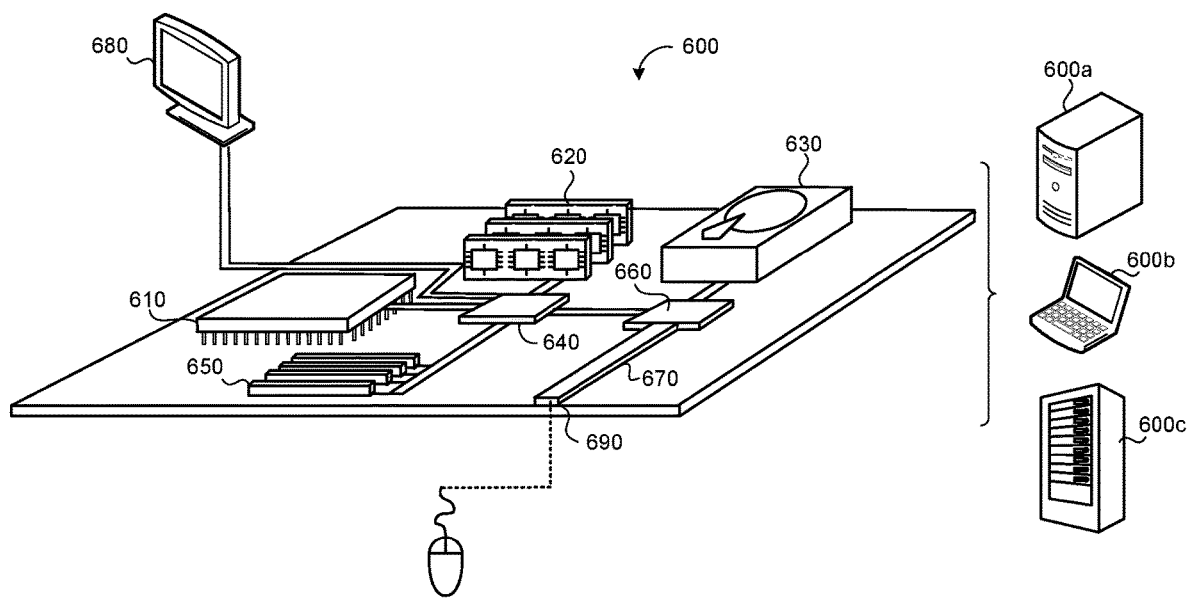
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware, a load-balancing configuration for a multi-cluster service managing access to a set of destination clusters hosting a software application deployed by a user, the multi-cluster service configured to use the load-balancing configuration to load balance application level traffic associated with the software application across the set of destination clusters, each destination cluster comprising:
        at least one container executing the software application; and
        a respective geographical region that is the same or different than at least one other geographical region associated with another one of the destination clusters in the set of destination clusters;
    receiving, at the data processing hardware, an application level request directed toward the software application hosted across the set of destination clusters, the application level request received from a client and comprising a host name and a geographical location associated with the client;
    routing, by the data processing hardware, the application level request to one of the destination clusters in the set of destination clusters based on the geographical location of the application level request and the respective geographical regions of the set of destination clusters; and
    for each destination cluster in the set of destination clusters, instantiating, by the data processing hardware, a corresponding derived service within the destination cluster, the corresponding derived service configured to create a corresponding network endpoint group (NEG) that comprises a group of endpoints, each endpoint in the group of endpoints associated with a respective container of the destination cluster and comprising a respective internet protocol (IP) address and a respective port for distributing application level traffic directly to the respective container.

2. The method of claim 1, wherein routing the application level request comprises:
    determining which destination cluster in the set of destination clusters is closest to the geographical location associated with the client of the application level request based on the respective geographical locations of the set of destination clusters; and
    routing the application level request to the destination cluster in the set of destination clusters having the respective geographical location that is closest to the geographical location associated with the client of the application level request.

3. The method of claim 1, wherein routing the application level request is further based on respective load balancing attributes specified by the multi-cluster service for each destination cluster in the set of destination clusters.

4. The method of claim 1, wherein the received load-balancing configuration comprises a user-derived service name that uniquely identifies the multi-cluster service.

5. The method of claim 1, further comprising:
    identifying, by the data processing hardware, cluster selection criteria specified by the multi-cluster service for choosing clusters from a list of known clusters that will serve application level traffic for the multi-cluster service; and
    selecting, by the data processing hardware, the set of destination clusters from the list of known clusters based on each destination cluster in the set of destination clusters having a respective set of one or more labels that satisfy the cluster selection criteria specified by the multi-cluster service.

6. The method of claim 5, wherein the cluster selection criteria specified by the multi-cluster service comprises at least one of one or more equality-based matching requirements or one or more set-based matching requirements.

7. The method of claim 1, wherein each corresponding derived service comprises a unique derived service name that is different than the derived service names of the other derived services, the derived service name having a trimmed service name portion and a unique hash portion, the trimmed service name portion comprising a user-derived service name of the multi-cluster service and the unique hash portion comprising a unique hash of the user-derived service name of the multi-cluster service.

8. The method of claim 1, further comprising, in response to receiving the application level request:
    accessing, by the data processing hardware, a uniform resource locator (URL) mapping, the URL mapping specifying a list of one or more host names that map to a service of one or more of the destination clusters;
    determining, by the data processing hardware, whether the host name of the received application level request comprises one of the one or host names in the list of one or more host names specified by the URL mapping; and
    when the host name of the received application level request comprises of the one or more host names, forwarding, by the data processing hardware, the received application level request to the service.

9. The method of claim 1, wherein the application level traffic comprises HyperText Transfer Protocol (HTTP).

10. The method of claim 1, wherein the application level traffic comprises HyperText Transfer Protocol Secure (HTTPS) protocol.

11. The method of claim 1, wherein at least a portion of the application level request comprises a transport layer security (TLS) protocol.

12. The method of claim 1, further comprising, prior to routing the application level request:
    for each destination cluster in the set of destination clusters:
        determining, by the data processing hardware, whether a number of application level requests currently routed to the destination cluster satisfies a maximum request rate; and
        when the number of application level requests satisfies the maximum request rate, preventing routing of the application level request to the destination cluster.

13. A system comprising:
    data processing hardware; and memory hardware in communication with the data processing hardware, the memory hardware storing instructions that when executed on the data processing hardware cause the data processing hardware to perform operations comprising:
    receiving a load-balancing configuration for a multi-cluster service managing access to a set of destination clusters hosting a software application deployed by a user, the multi-cluster service configured to use the load-balancing configuration to load balance application level traffic associated with the software application across the set of destination clusters, each destination cluster comprising:
        at least one container executing the software application; and
        a respective geographical region that is the same or different than at least one other geographical region associated with another one of the destination clusters in the set of destination clusters;
    receiving an application level request directed toward the software application hosted across the set of destination clusters, the application level request received from a client and comprising a host name and a geographical location associated with the client;
    routing the application level request to one of the destination clusters in the set of destination clusters based on the geographical location of the application level request and the respective geographical regions of the set of destination clusters; and
    for each destination cluster in the set of destination clusters, instantiating a corresponding derived service within the destination cluster, the corresponding derived service configured to create a corresponding network endpoint group (NEG) that comprises a group of endpoints, each endpoint in the group of endpoints associated with a respective container of the destination cluster and comprising a respective internet protocol (IP) address and a respective port for distributing application level traffic directly to the respective container.

14. The system of claim 13, wherein routing the application level request comprises:
    determining which destination cluster in the set of destination clusters is closest to the geographical location associated with the client of the application level request based on the respective geographical locations of the set of destination clusters; and
    routing the application level request to the destination cluster in the set of destination clusters having the respective geographical location that is closest to the geographical location associated with the client of the application level request.

15. The system of claim 13, wherein routing the application level request is further based on respective load balancing attributes specified by the multi-cluster service for each destination cluster in the set of destination clusters.

16. The system of claim 13, wherein the received load-balancing configuration comprises a user-derived service name that uniquely identifies the multi-cluster service.

17. The system of claim 13, wherein the operations further comprise:
    identifying cluster selection criteria specified by the multi-cluster service for choosing clusters from a list of known clusters that will serve application level traffic for the multi-cluster service; and
    selecting the set of destination clusters from the list of known clusters based on each destination cluster in the set of destination clusters having a respective set of one or more labels that satisfy the cluster selection criteria specified by the multi-cluster service.

18. The system of claim 17, wherein the cluster selection criteria specified by the multi-cluster service comprises at least one of one or more equality-based matching requirements or one or more set-based matching requirements.

19. The system of claim 13, wherein each corresponding derived service comprises a unique derived service name that is different than the derived service names of the other derived services, the derived service name having a trimmed service name portion and a unique hash portion, the trimmed service name portion comprising a user-derived service name of the multi-cluster service and the unique hash portion comprising a unique hash of the user-derived service name of the multi-cluster service.

20. The system of claim 13, wherein the operations further comprise, in response to receiving the application level request:
    accessing a uniform resource locator (URL) mapping, the URL mapping specifying a list of one or more host names that map to a service of one or more of the destination clusters;
    determining whether the host name of the received application level request comprises one of the one or host names in the list of one or more host names specified by the URL mapping; and
    when the host name of the received application level request comprises one of the one or more host names, forwarding the received application level request to the service.

21. The system of claim 13, wherein the application level traffic comprises HyperText Transfer Protocol (HTTP).

22. The system of claim 13, wherein the application level traffic comprises HyperText Transfer Protocol Secure (HTTPS) protocol.

23. The system of claim 13, wherein at least a portion of the application level request comprises a transport layer security (TLS) protocol.

24. The system of claim 13, wherein the operations further comprise, prior to routing the application level request:
    for each destination cluster in the set of destination clusters:
        determining whether a number of application level requests currently routed to the destination cluster satisfies a maximum request rate; and
        when the number of application level requests satisfies the maximum request rate, preventing routing of the application level request to the destination cluster.

\* \* \* \* \*